United States Patent [19]

Nakamura et al.

[11] Patent Number: 5,457,673
[45] Date of Patent: Oct. 10, 1995

[54] CD-ROM REPRODUCTION APPARATUS

[75] Inventors: Hiroshi Nakamura; Tsutomu Takahashi, both of Saitama, Japan

[73] Assignee: Pioneer Electronic Corporation, Tokyo, Japan

[21] Appl. No.: 82,452

[22] Filed: Jun. 25, 1993

[30] Foreign Application Priority Data

Jun. 30, 1992 [JP] Japan ................................. 4-172757

[51] Int. Cl.$^6$ ................................. G11B 3/90; G11B 5/09; G06F 11/00
[52] U.S. Cl. ................................. 369/53; 369/58; 369/45; 360/53; 371/5.1
[58] Field of Search ................................. 369/47, 48, 58, 369/54, 59, 60, 44.32, 124; 360/26, 31, 32, 53; 371/3, 5.1, 40.1, 37.5; 358/341, 242, 343, 335

[56] References Cited

U.S. PATENT DOCUMENTS

| | | | |
|---|---|---|---|
| 4,688,207 | 8/1987 | Yoshimoto | 371/3 X |
| 4,707,805 | 11/1987 | Narasawa et al. | 360/32 |
| 4,796,100 | 1/1989 | Sakaguchi | 358/342 |
| 4,809,273 | 2/1989 | Jackowski et al. | 371/3 |
| 4,876,719 | 10/1989 | Nakagami et al. | 369/47 X |
| 4,901,318 | 2/1990 | Tomisawa | 371/40.1 |
| 5,222,086 | 6/1993 | Fujita | 371/37.5 |
| 5,282,186 | 1/1994 | Yoshio et al. | 369/58 X |
| 5,285,289 | 2/1994 | Hatanaka et al. | 358/343 |
| 5,313,443 | 5/1994 | Iitsuka | 369/50 |

*Primary Examiner*—Georgia Y. Epps
*Assistant Examiner*—Nabil Hindi
*Attorney, Agent, or Firm*—Sughrue, Mion, Zinn, Macpeak & Seas

[57] ABSTRACT

A CD-ROM reproduction apparatus which allows error correction for both audio data and CD-ROM data using a single error correction circuit with a miniaturized size. The CD-ROM reproduction apparatus comprises, in addition to the single error correction circuit, an error syndrome monitoring circuit to monitor the error syndromes generated upon error correction processing and to detect presence or absence of an error. Depending upon whether error correction is performed for audio data or for CD-ROM data, the internal connection of the error correction circuit is switched so that the error correction circuit performs error correction for audio data or CD-ROM data. Error correction calculation by the error correction circuit is not performed for audio data or CD-ROM data discriminated to include no errors by the error syndrome monitoring circuit.

1 Claim, 8 Drawing Sheets

FIG. 3a

| CLK | ⨆⨆⨆⨆⨆⨆⨆⨆⨆⨆⨆⨆ |
|---|---|
| STEP | 00 \| 01 \| 02 \| 03 \| 04 \| 05 \| 06 \| 07 \| 08 \| 09 \| 0A \| 0B |
| INPUT | S1 \| S0 \| S1 \| S0 \| S1 \| S0 \| S1 \| ? \| S1 |
| D1 | 0(RESET) \| S1v \| S0v \| S1v \| S0v \| S1v \| ? \| S1v |
| SEL1 | 0(RESET) \| S1v \| S0v \| S1v \| S0v \| S1v \| ? \| S1v \| S0v \| S1v |
| SEL5 | FF(RESET) \| S1e \| S0e \| S1e \| S0e \| S1e \| ? \| S1e \| S0e \| S1e |
| SEL2 | FF(RESET) \| S1e \| S0e \| FF \| S0e \| S1/S0 \| S1e \| ? \| S1e \| S0e \| S1e |
| D2 | XX \| S1e \| S0e \| ? |
| D3 | 0(RESET) |
| SEL3 | XX \| 0 \| S1e \| S0e \| 0 \| ? |
| D4 | 0(RESET) \| S0e \| S1/S0 \| S1e \| S0e |

(NOTE) SUFFIX v DENOTES VECTOR FORM
SUFFIX e DENOTES EXPONENT FORM

FIG. 3b

| | | 00 | 01 | 02 | 03 | 04 | 05 | 06 | 07 | 08 | 09 | 0A | 0B |
|---|---|---|---|---|---|---|---|---|---|---|---|---|---|
| CLK | | ‾|_|‾|_|‾|_|‾|_|‾|_|‾|_|‾|_|‾|_|‾|_|‾|_|‾|_|‾|_ | | | | | | | | | | | |
| STEP | 00 | | | | | | | | | | | | |
| EXOR1 | XX | | | 0 | | | S1e | S0e | 0 | ? | | | |
| EXOR2 | 0(RESET) | | | | S0e-S0e | | ? | S1e | ? | S1e | S0e | | |
| D5 | XX | | | 0 | | | S0 | S1/S0 | ? | S1 | S0e | | |
| D6 | 0 XX | | | 0 | | | S0 | S1/S0 | ? | S1 | ? | | |
| | | | | | | S1/S0 | | | S1/S0 | | | | |
| SEL4 | 0 XX | | | FF | 0 | S0 | ? | ? | S0 | ? | | | |
| D7 | XX | | | | 0 | S0 | ? | S1/S0 | | | | | |
| D8 | XX | | | | 0 | | | S0 | | | | | |
| D9 | XX | | | | | | Ei | | | | | | |
| D11 | | | | | | | Ei=S0 | | | | | | |
| | | | | | | | Ai=S1/S0 | Ai | Ai shift | | | | |

(NOTE) SUFFIX v DENOTES VECTOR FORM
SUFFIX e DENOTES EXPONENT FORM

F I G. 4a

| CLK | STEP | INPUT | D1 | SEL1 | SEL5 | SEL2 | D2 | D3 | SEL3 | D4 |
|---|---|---|---|---|---|---|---|---|---|---|
| | 00 | S1 | 0(RESET) | 0(RESET) | 0(RESET) | 0(RESET) | XX | 0(RESET) | XX | 0(RESET) |
| | 01 | Aj | | | | | | | | |
| | 02 | Ai | | | | | | | | |
| | 03 | S0 | Aje | Aje | S1v Aje | S1v Aje | | | | |
| | 04 | S1 | Aie S0v | Aie S0v | Aie S0e | 0 Aie S0e | | | | S1v Aje |
| | 05 | Aj | | | | | | | | 0 |
| | 06 | | | | | 0 | | | | Aie |
| | 07 | | | Ai+Aj(=#) | Ai+Aj(=#) | Ai+Aj(=#) | | | | 0 |
| | 08 | S0 | S0v | $ S0v | $ S0e | $ S0e | S0e | S0e | 0 | S1e Aje |
| | 09 | S1 Aj | S1v Aje | S1v Aje | S1e ? | ? Ej S0e | | | $ 0 | 0 Ai+Aj(=#) |
| | 0A | | | | | | | | | |
| | 0B | | | | | | | | | |
| | 0C | | | | | | S1+S0*Ai(=$) Ej | | | S0e |
| | 0D | | | | | | | | Ej | |
| | 0E | | S0v | S0v | S0e | S0e | | | | ? |
| | 0F | S1 Aj | S1v Aje | S1v Aje | S1e | S0e | | | | |
| | 10 | | | | | | | | | |
| | 11 | | | | | | | | | |
| | 12 | | | | | | | | | |
| | 13 | | | | | | | | | |
| | 14 | | | | | | | | | |
| | 15 | S0 | | | | | | | | |
| | 00 | | | | | | | | | |

(NOTE) SUFFIX v DENOTES VECTOR FORM
SUFFIX e DENOTES EXPONENT FORM

FIG. 4b

| CLK | | | | | | | | | | | | | | | | | |
|---|---|---|---|---|---|---|---|---|---|---|---|---|---|---|---|---|---|
| STEP | 00 | 01 | 02 | 03 | 04 | 05 | 06 | 07 | 08 | 09 | 0A | 0B | 0C | 0D | 0E | 0F | 10 | 11 | 12 | 13 | 14 | 15 | 00 |
| EXOR1 | XX | 0 | | | | | | $S0_e$ | | | | | | $ | | | | FF | | | | 0 | $E_j$ |
| EXOR2 | 0(RESET) | | | $S1_v$ | $Ai_e$ | | $Ai_e$ | | 0 | $S1_e$ | $Aj_e$ | 0 | | $-\#$ | $S0_e$ | | | | | | ? | |
| | | | | | | $Ai+Aj(=\#)$ | | | | | | | $Ai+Aj(=\#)$ | | | | | | | | | |
| D5 | XX | | 0 | $S1_v$ | $Aj_e$ | 0 | $Ai_e$ | | 0 | $S1_e$ | $Aj_e$ | 0 | | $E_j$ | $S0_e$ | | | | | | ? | |
| | | | | $S0*S1$ | | | | | | | | | $E_j=\$/\#$ | | | | | | | | | |
| D6 | 0 XX | | 0 | $S1_v$ | $Aj_e$ | 0 | $Ai_e$ | | 0 | $S1_e$ | $Aj_e$ | 0 | | $E_j$ | $S0_e$ | | | | | | ? | |
| | | | | $S0*S1$ | | | | | | | | | $Ai+Aj(=\#)$ | | | | | | | | | |
| SEL4 | 0 XX | | 0 | $S1_v$ | $Aj_e$ | 0 | $Ai_e$ | | 0 | $S1_e$ | $Aj_e$ | FF | | $E_j$ | $S0_e$ | | | | | | ? | |
| D7 | XX | | | ? | | $Ai_v$ | $S1*Ai$ | | | | | | | FF | | | | | | | $S0_v$ | |
| D8 | XX | | | | $Aj_v$ | | | | | | $S1_v$ | | | | | | | $E_j$ | | | $S0_v$ | ? |
| D9 | XX | | | | | | | | | | $Ai+Aj(=\#)$ | | | $S1+S0*Ai(=\$)$ | | | | | $E_j$ | $E_i$ | | |
| D11 | | | | | | $Ai$ | | | $Aj$ | | | | | | | | | | $E_i=S0+E_j$ | | | |

(NOTE) SUFFIX v DENOTES VECTOR FORM
SUFFIX e DENOTES EXPONENT FORM

F I G. 6

|   | 0 | 1 | 2 | 3 | 4 | · | · | · | · | 40 | 41 | 42 |
|---|---|---|---|---|---|---|---|---|---|----|----|----|
| 0 | 0000 | 0001 | 0002 | 0003 | 0004 | ...... | ...... | ...... | ...... | 0040 | 0041 | 0042 |
| 1 | 0043 | 0044 | 0045 | 0046 | 0047 | ...... | ...... | ...... | ...... | 0083 | 0084 | 0085 |
| 2 | 0086 | 0087 | 0088 | 0089 | 0090 | ...... | ...... | ...... | ...... | 0126 | 0127 | 0128 |
| 3 | 0129 | 0130 | 0131 | 0132 | 0133 | ...... | ...... | ...... | ...... | 0169 | 0170 | 0171 |
| 4 | 0172 | 0173 | 0174 | 0175 | 0176 | ...... | ...... | ...... | ...... | 0212 | 0213 | 0214 |

Q SEQUENCE

P SEQUENCE

HEADER AND USER DATA

| 22 | 0946 | 0947 | 0948 | 0949 | 0950 | ...... | ...... | ...... | ...... | 0986 | 0987 | 0988 |
| 23 | 0989 | 0990 | 0991 | 0992 | 0993 | ...... | ...... | ...... | ...... | 1029 | 1030 | 1031 |
| 24 | 1032 | 1033 | 1034 | 1035 | 1036 | ...... | ...... | ...... | ...... | 1072 | 1073 | 1074 |
| 25 | 1075 | 1076 | 1077 | 1078 | 1079 | ...... | ...... | ...... | ...... | 1115 | 1116 | 1117 |
| 26 | 1118 | 1119 | 1120 | 1121 | 1122 | ...... | ...... | 1143 |
| 27 | 1144 | 1145 | 1146 | 1147 | 1148 | ...... | ...... | 1169 |

P PARITY

Q PARITY

REED-SOLOMON CODE ON GF($2^8$)

CD-ROM REPRODUCTION APPARATUS

BACKGROUND OF THE INVENTION

1. Field of the Invention

This invention relates to a CD-ROM reproduction apparatus.

2. Description of the Prior Art

A CD-ROM (compact disk read only memory) reproduction apparatus conventionally has a general construction as illustrated in FIG. 5. Referring to FIG. 5, a recording signal of a CD-ROM disk 2 is read out by an optical pickup 1 and the signal read from the CD-ROM is transmitted to an audio signal processing section 3, where the signal is first demodulated by EFM demodulation by an EFM demodulation circuit 4 and then stored into an audio data RAM (random access memory) 5. Then, the output signal of the audio data RAM 5 is directed to a de-interleave circuit 6 and an audio data error correction circuit 7, in which $C_1$ and $C_2$ errors in the output signal are detected and corrected, and then, the signal is supplied to a CD-ROM signal processing section 8.

From the CD-ROM signal processing section 8, the data after correction of the $C_1$ and $C_2$ errors is stored into a CD-ROM data RAM 9, and then; P and Q errors in the output signal are detected and corrected by a descrambler 10, a RAM controller 11 and a CD-ROM data error correction circuit 12, and finally the data is sent to an external host computer 14 via an interface 13. The conventional CD-ROM reproduction apparatus further includes a system controller 15 for controlling the operation of the entire system, a spindle motor 16, a CLV control circuit 17, and a focusing and tracking servo circuit 18.

The error correction processing of the audio data error correction circuit 7 and the CD-ROM data error correction circuit 12 in the conventional CD-ROM reproduction apparatus will be described below.

Audio Data Error Correction

Audio data error correction is performed in the error correction circuit 7 using double error correction Reed-Solomon codes of (32, 28) and (28, 24) on $GF(2^8)$ called $C_1$ and $C_2$, respectively.

First, error syndromes $S_0$, $S_1$, $S_2$ and $S_3$ are calculated in accordance with the following equations:

$$S_0 = \sum_{i=0}^{n-1} Yi \quad (1)$$

$$S_1 = \sum_{i=0}^{n-1} (\alpha)^i Yi \quad (2)$$

$$S_2 = \sum_{i=0}^{n-1} (\alpha^2)^i Yi \quad (3)$$

$$S_3 = \sum_{i=0}^{n-1} (\alpha^3)^i Yi \quad (4)$$

where n=32 for $C_1$, but n=28 for $C_2$.

Using the above described error syndromes $S_0$, $S_1$, $S_2$, and $S_3$, error detectors A, B, and C for the criteria are calculated according to the following equations:

$$A = S_0 \cdot S_2 + S_1^2 \quad (5)$$

$$B = S_1 \cdot S_2 + S_0 \cdot S_3 \quad (6)$$

$$C = S_1 \cdot S_3 + S_2^2 \quad (7)$$

Using the error syndromes $S_0$, $S_1$, $S_2$, and $S_3$ and the error indicators A, B, and C calculated as described above, the number of errors is determined according to the following criteria:

A. No error→when $S_0=0$, $S_3=0$, and A=B=C=0

B. Single error→when $S_0 \neq 0$, $S_3 \neq 0$, and A=B=C=0

Where the root of the creation polynomial for a Reed-Solomon code is represented by $\alpha$, the position of the error by i, and the value of the error by ei, $$\alpha^i = S_1/S_0 \quad (8)$$

$$e^i = S_0 \quad (9)$$

where $\alpha^i$ is an exponential representation of the position of the error i, and accordingly, $$i = \log\alpha(S_1/S_0) \quad (10)$$

C. Double error→when $A \neq 0$, $B \neq 0$, and $C \neq 0$

Where the root of the creation polynomials for the Reed-Solomon codes for the two errors is represented by $\alpha$, the positions of the two errors by i and j and the values of the two errors by ei and ej, $$\alpha^i = D/X \quad (11)$$

$$\alpha^j = D/Y \quad (12)$$

$$ei = S_0/Y + S_1/D \quad (13)$$

$$ej = S_0 X + S_1/D \quad (14)$$

where D, E, X, and Y are given by $$D = B/A \quad (15)$$

$$E = C/A \quad (16)$$

$$D^2/E \to X \quad (17)$$

$$Y = D^2/E + X \quad (18)$$

Where $D^2/E.X$ conversion ROM or a like device using a PLA (programmable logic array) of 8 bits is implemented to calculate X.

Error correction is thus performed in accordance with the positions and the values of the errors obtained in any case described above.

Error Correction of CD-ROM Data

Error correction of CD-ROM data is performed by the error correction circuit 12 using P parity and Q parity as shown in FIG. 6 for data of one sector (98 frames) which are each divided into two upper and lower bytes. It is to be noted that P is a (26, 24) Reed-Solomon code on $GF(2^8)$ and Q is a (45, 43) Reed-Solomon code on $GF(2^8)$. Detection correction of one byte and disappearance correction of 2 bytes can be performed using this P parity and Q parity.

A. One Byte Detection Correction

Where the root of the creation polynomial for a Reed-Solomon code is represented by $\alpha$, the syndromes of CD-ROM data by $S_0$ and $S_1$ and the position of the error is represented by i and the value of the error by ei, $$\alpha^i = S_1/S_0 \quad (19)$$

$$ei = S_0 \quad (20)$$

and accordingly, $$i = \log\alpha(S_1/S_0) \quad (21)$$

B. Two Byte Disappearance Correction

Where the root of the creation polynomials for the Reed-Solomon codes for the two errors is represented by $\alpha$, the positions of the errors known as error pointers are represented by i and j and the values of the errors by ei and ej, $$S_0 ei + ej \quad (22)$$

$$S_1 = \alpha^i ei + \alpha^j ej \quad (23)$$

and accordingly, the values ei and ej of the errors can be obtained by solving the simultaneous equations (22) and (23).

In the conventional CD-ROM reproduction apparatus described above, the audio signal processing section 3 and the CD-ROM signal processing section 8 are constructed as separate sections and accordingly the error correction circuit 7 for audio data and the error correction circuit 12 for CD-ROM data are constructed independently of each other, as illustrated in FIG. 5. Consequently, a comparatively large scale circuit is required, and reduction in size of the apparatus is difficult.

SUMMARY OF THE INVENTION

It is an object of the present invention to provide a CD-ROM reproduction apparatus which implements error correction for both audio data and CD-ROM data using a single error correction circuit and is minimized in size.

In order to attain the object described above, according to the present invention, there is provided a CD-ROM reproduction apparatus, which comprises: a means for reading audio data and CD-ROM data from a CD-ROM, a means for the calculation of error syndromes from the audio data and the CD-ROM data, an error syndrome monitoring means for monitoring the error syndromes to detect presence or absence of an error in the audio data or the CD-ROM data, a single error correction circuit including an audio data error correction function and a CD-ROM data error correction function, a switching means to facilitate the internal selection of the error correction circuit depending upon whether error correction should be performed for the audio data or the CD-ROM data, and a control means disabling calculation of the error criteria by the error calculation circuit for the audio or CD-ROM data when no errors are detected by the error syndrome monitoring means. Preferably, when a request for error correction for the audio data and another request for error correction for the CD-ROM data are inconsistent with each other, the control means causes the error correction circuit to perform error correction for the audio data preferentially.

As described above, during the duplication of a CD-ROM disk, error correction for audio data is first performed using $C_1$ and $C_2$, and then error correction for CD-ROM data is performed using P parity and Q parity. The two error correction operations are both performed with Reed-Solomon codes on $GF(2^8)$. Accordingly, ROMs for exponent and vector conversion in error correction calculation are the same as each other, and the general calculation flow processes required for decoding are almost identical to each other.

Therefore, if a single error correction circuit is implemented and the connections of the internal circuit of the error correction circuit are switched back and forth during the error correction processing between the audio data and the CD-ROM data, in accordance with a required processing flow for audio data or CD-ROM data, then error correction for audio data and CD-ROM data can be performed. The present invention has been made taking advantage of this property.

When error correction for audio data CD-ROM data are performed using a single error correction circuit in the manner described above, the signal processing time may possibly be increased because only one error correction circuit is in use. Therefore, according to the present invention, in order to eliminate the potential speed problems, a means of monitoring the error syndromes has been incorporated so that error correction calculation is not performed for audio data or CD-ROM data having no errors.

In particular, with the conventional CD-ROM reproduction apparatus described above, A, B and C are calculated after the syndromes $S_0=0$ and $S_3=0$ are detected, and then presence or absence of an error is discriminated depending on whether $A=B=C=0$. With the CD-ROM reproduction apparatus according to the new invention, even when audio data or CD-ROM data include no errors, the error correction calculation circuit is still active. However, if $S_0=0$, $S_3=0$ and $A=B=C=0$, then $S_1=0$ and $S_2=0$ must also be the case. Accordingly, if $S_0=S_1=S_2=S_3=0$ is confirmed before A, B and C are calculated, no error in data can be discriminated in advance.

Therefore, according to the present invention, the means for monitoring the error syndromes is provided to discriminate $S_0=S_1=S_2=S_3=0$ so that presence or absence of an error may be detected before the calculation circuit for error correction operates. According to this implementation, the calculation of error correction for data having no error can be eliminated. Consequently, the processing time for error correction is reduced and a high processing rate can be assured while employing the single error correction circuit.

Although high rate processing for such error correction is not very important when the data from a CD-ROM is read out at the standard rate (150 Kbytes/sec), it becomes critical when a CD-ROM is read out at a high rate, such as a rate equal to four times the standard rate (600 Kbytes/sec). The CD-ROM reproduction apparatus of the present invention can accommodate such high rates of data output while employing the single error correction circuit, according to the present invention.

Further, since error correction for audio data and CD-ROM data can be performed by means of the single error correction circuit, the size of the CD-ROM reproduction apparatus can be reduced.

If audio data is not output continuously on the real time basis, by the present invention, then the reproduced sound will be intermittent. Accordingly, when a request for error correction for audio data and CD-ROM data are inconsistent or collide with each other, error correction for audio data is performed preferentially, and thereafter, error correction for CD-ROM data is performed. Accordingly, a smooth error correction processing is realized.

The objects, features and advantages of the present invention will be explained by the following description and the attached claims, in conjunction with the accompanying drawings.

BRIEF DESCRIPTION OF THE DRAWINGS

FIG. 3a and FIG. 3b combine to form a time plot illustrating detection correction operation for CD-ROM data by the error correction circuit of FIG. 2;

FIG. 4a and FIG. 4b combine to form a time plot illustrating disappearance correction operation for CD-ROM data by the error correction circuit of FIG. 2;

FIG. 6 is a table showing a format used in an error correction method of a CD-ROM.

DESCRIPTION OF THE PREFERRED EMBODIMENT

Figure 1:
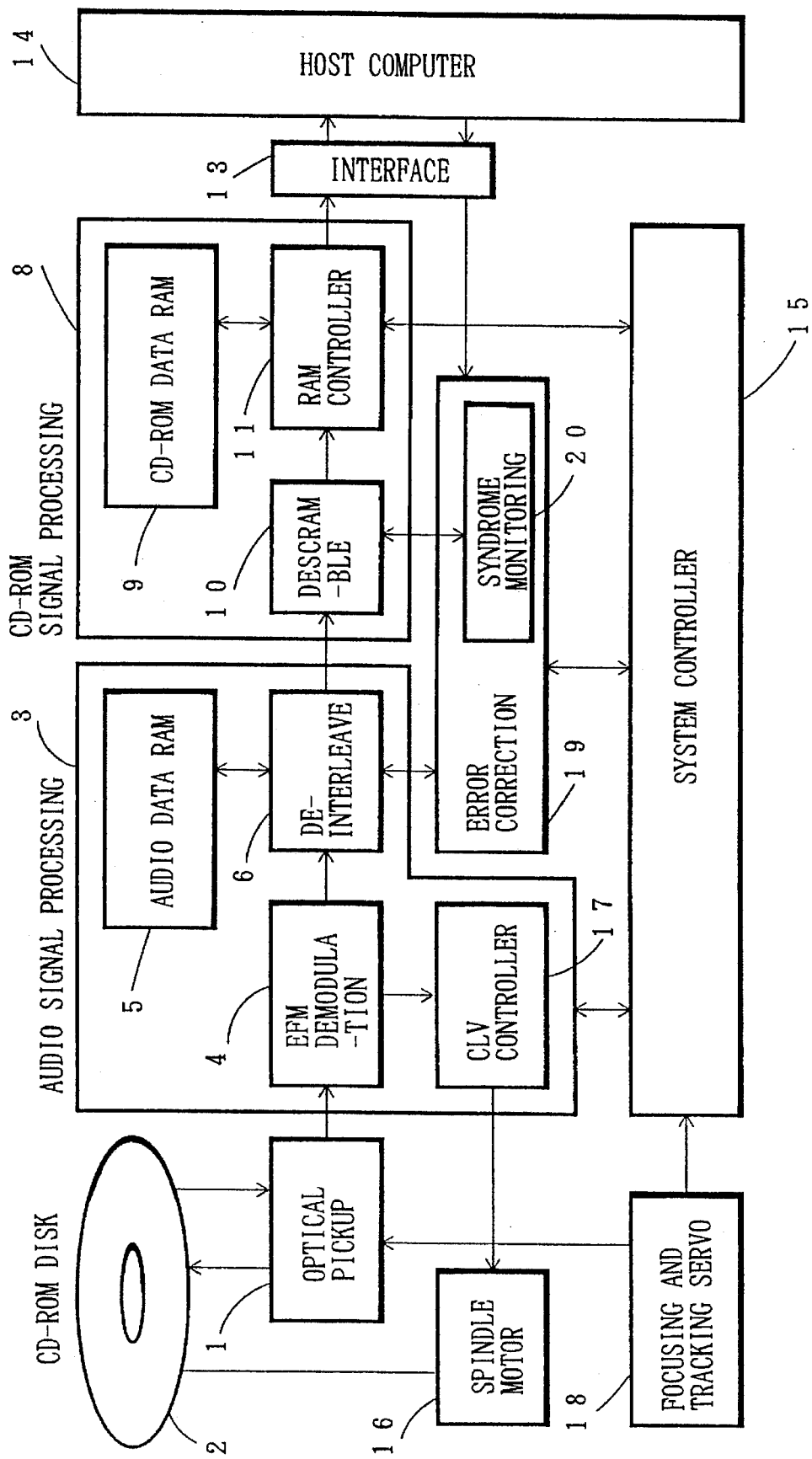
FIG. 1 is a block diagram illustrating the basic structure of a CD-ROM reproduction apparatus according to the present invention.
Figure 5:
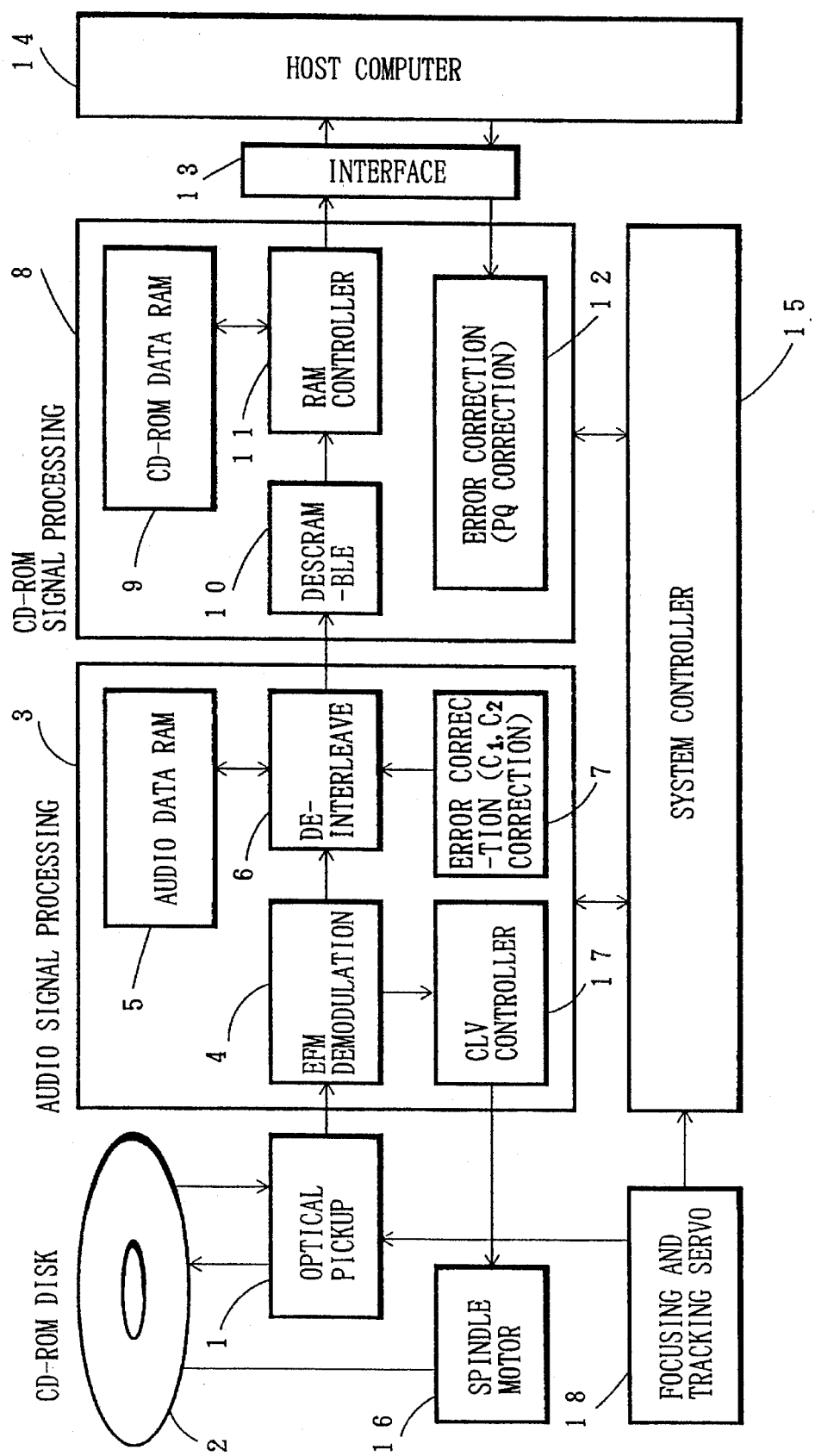
FIG. 5 is a block diagram showing a general construction of a conventional CD-ROM reproduction apparatus.

Referring first to FIG. 1, a CD-ROM reproduction apparatus is illustrated incorporating the basic structure of the present invention. Similarly to the conventional CD-ROM reproduction apparatus as described above with reference to FIG. 5, the CD-ROM reproduction apparatus includes an optical pickup 1 for optically reading a CD-ROM disk 2, an audio signal processing section 3, a CD-ROM signal processing section 8, an interface 13 to a host computer 14, a system controller 15, a spindle motor 16, and a focusing and tracking servo circuit 18. The audio signal processing section 3 includes an EFM demodulation circuit 4, audio data RAM (random access memory) 5, a de-interleave circuit 6 and a CLV control circuit 17. The CD-ROM signal processing section 8 includes CD-ROM data RAM 9, a descramble circuit 10 and a RAM controller 11. However, in place of the error correction circuit 7 in the audio signal processing section 3 and the error correction circuit 12 in the CD-ROM signal processing section 8 included in the conventional CD-ROM reproduction apparatus, the CD-ROM reproduction apparatus designed according to the present invention includes a single error correction circuit 19 with an error syndrome monitoring circuit 20 therein.

The error syndrome monitoring circuit 20 monitors error syndromes produced by error correction processing to detect presence or absence of an error. The internal connection of the error correction circuit 19 is switched back and forth depending on whether error correction is performed for audio data or for CD-ROM data. When the syndrome monitoring circuit 20 determines that the selected data contains no errors, the error correction circuit 19 performs no error correction operations for the corresponding data. Further, when a request for error correction for audio data and another request for error correction for CD-ROM data are inconsistent with each other, the error correction circuit 19 gives priority to the error correction for audio data.

Figure 2:
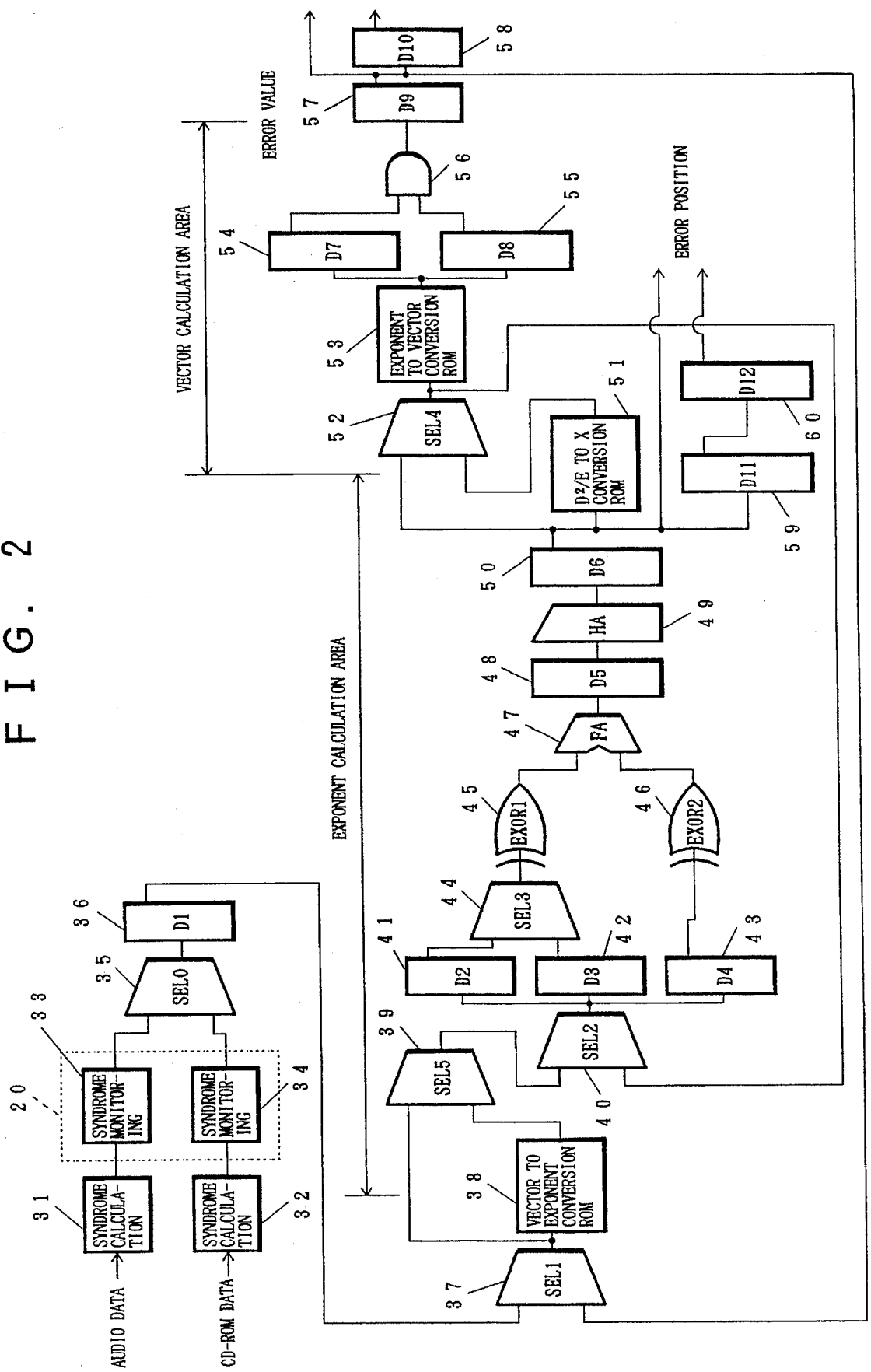
FIG. 2 is a block diagram of an error correction circuit employed in the CD-ROM reproduction apparatus of FIG. 1.

The error correction circuit 19 is shown in more detail in FIG. 2. In FIG. 2, only those circuit elements which are directly necessary for description of the present invention are shown.

Referring to FIG. 2, the error correction circuit shown includes an audio data error syndrome calculation circuit 31 connected to the audio signal processing section 3 shown in FIG. 1 for calculating error syndromes of audio data. A CD-ROM data error syndrome calculation circuit 32 is connected to the CD-ROM signal processing section 8 shown in FIG. 1 for calculating error syndromes of CD-ROM data. An audio data error syndrome monitoring circuit 33 and a CD-ROM data error syndrome monitoring circuit 34 make up the syndrome monitoring circuit 20 shown in FIG. 1.

The error correction circuit further includes a vector to exponent conversion ROM 38 to convert data in a vector form into data in an exponent form, a $D^2/E$ to X conversion ROM 51 to convert $D^2/E$ to X according to equation (17) above, and an exponent to vector conversion ROM 53 to convert data from the exponent form into data with a vector form. The error correction circuit further includes selectors (SEL0 to SEL5) 35, 37, 39, 40, 44 and 52 for input selection, and registers (D1 to D12) 36, 41 to 43, 48, 50, 54, 55 and 57 to 60 for temporary storage of data. The error correction circuit further includes a pair of exclusive OR (EXOR) circuits 45 and 46, a full adder (FA) 47 to multiply or divide by exponents, a half adder (HA) 49 for mod255 calculation on $GF(2^8)$, and an adder circuit 56 for addition of the vector form.

The elements in the sequence outlined in FIG. 2 beginning with the vector to exponent conversion ROM 38 up to and including the $D^2/E$ to X conversion ROM 51 constitute an exponent calculation area for multiplication and division in the exponent form. The remaining elements constitute a vector calculation area and execute addition and subtraction in the vector form.

Error correction operation for audio data and CD-ROM data according to an embodiment of the present invention as illustrated by the circuit shown in FIG. 2 is described below.

Error Correction Operation for Audio Data

First, the error syndrome calculation circuit 31 calculates error syndromes $S_0$ through $S_3$ from the audio data in accordance with the equations (1) to (4) from above. Then, the error syndrome monitoring circuit 33 discriminates whether the error syndromes thus obtained are all equal to 0, that is, $S_0=S_1=S_2=S_3=0$. When $S_0=S_1=S_2=S_3=0$, the audio data includes no errors, and accordingly, error correction calculation described below is not performed for the audio data. When the relationship $S_0=S_1=S_2=S_3=0$ is not true, the audio data most likely includes an error or errors, and accordingly, error correction calculation described below is performed on the audio data.

First, the error syndromes obtained by the calculation described above are converted into data in the exponent form by the vector to exponent conversion ROM 38 and then transmitted to the registers 41 to 43. Error syndrome $S_0$ is stored in register 41, error syndrome $S_1$ in register 42, and error syndromes $S_2$ and $S_3$ are successively stored in register 43, in accordance with the steps prescribed by the process. The full adder 47 and the half adder 49 are used to calculate $S_0 \cdot S_2$ and $S_1^2$ from the error syndromes, selected by the selector 44, and the resulting values are stored in register 50.

The values $S_0 \cdot S_2$ and $S_1^2$ available at register 50 are converted into vector form by the exponent to vector conversion ROM 53 and then stored in registers 54 and 55, respectively. Registers 54 and 55 are added by the adder circuit 56 and the result is stored in register 57, by which $A = S_0 \cdot S_2 + S_1^2$ of equation (5) above is obtained. The value of B and C for the equations (6) and (7) above are calculated in a similar manner.

The values of variables A, B and C obtained above are routed from the register 57 back to the selector 37 and stored by the selector 37 in registers 41 to 43, respectively. The values of D and E are calculated according to equations (15) and (16) and the results are stored in register 50 in a similar manner as described above.

The values of variables D and E are routed from register 50 through the selector 52 back to the selector 40 to calculate $D^2$ in a similar manner as described above. The value of $D^2$ is routed back to the selector 40 to calculate $D^2/E$. The quantity $D^2/E$ is calculated and converted into X by the $D^2/E$ to X conversion ROM 51. The value of X and $D^2/E$ are added by the adder circuit 56 to calculate the variable Y where $Y=D^2/E+X$ according to equation (18) and the value calculated is stored in register 57.

The steps described above calculate the values of the variables necessary for error correction. These variables are checked with reference to the criteria described above. If the audio data is determined to include a single error, the value of $\alpha^i$ is calculated in the exponent calculation area where $\alpha^i=S_1/S_0$ according to equation (8).

If the audio is determined to include two errors, the values of the exponential representations of the two error positions $\alpha^i$ and $\alpha^j$ are calculated in the exponent calculation area from the values of $S_0$, $S_1$, D, X, and Y as determined above according to equations (11) and (12). The values of the errors ei and ej are calculated in a similar manner according to equations (13) and (14).

Error Correction Operation for CD-ROM Data

When error correction is performed using the CD-ROM data, the selector 35 in FIG. 2 is switched to receive only the CD-ROM data.

Error correction for CD-ROM data includes detection correction and disappearance correction as described above. For the detection correction, the value of $\alpha^i$ is calculated in the exponent calculation area where $\alpha^i=S_1/S_0$, according to equation (19). The operation of the error correction circuit during detection correction is illustrated by the time plots in FIG. 3a and FIG. 3b. In these time plots, the $\alpha^i$ is represented by Ai and the error value ei is represented by Ei. Further, the suffix v represents the vector form, and the suffix e represents the exponent form.

Because the syndromes $S_0$ and $S_1$ and the exponential representations of the two error positions $\alpha^i$ and $\alpha^j$ are provided in advance in disappearance correction, the simultaneous equations (22) and (23) can be solved and the error values ei and ej can be determined. The operation of the error correction circuit during disappearance correction is illustrated by the time plots in FIG. 4a and FIG. 4b. In these time plots the exponential representations of the two error positions $\alpha^i$ and $\alpha^j$ are represented by Ai and Aj, and the error values ei and ej are represented by Ei and Ej, respectively. The suffix v represents the vector form, and the suffix e represents the exponent form.

It should be apparent to one of ordinary skill in the art that many changes and modifications can be made to the invention described above without departing from the spirit and scope of the invention as set forth herein.

What is claimed is:

1. A CD-ROM reproduction apparatus, comprising:

means for reading out audio data and CD-ROM data from a CD-ROM;

means for calculating error syndromes from the audio data and the CD-ROM data;

error syndrome monitoring means to monitor the error syndromes so as to detect the presence or absence of an error in the audio data or the CD-ROM data;

a single error correction circuit having an audio data error correction function and a CD-ROM data error correction function;

switching means for changing over the internal connection of said error correction circuit depending upon whether error correction should be performed for the audio data or the CD-ROM data so as to allow said error correction circuit to perform error correction for the audio data or error correction for the CD-ROM data; and means for causing said error correction circuit to preferentially perform error correction according to the error syndromes of the audio data when a request for error correction according to the error syndromes of the audio data and another request for error correction according to the syndromes of the CD-ROM data are inconsistent with each other;

said causing means comprising control means operable in response to the discrimination of no error by said error syndrome monitoring means to prevent said error correction circuit from performing error correction for the audio data or the CD-ROM data for which the discrimination of no error was made.

* * * * *